United States Patent [19]

Tourret

[11] Patent Number: 4,693,432
[45] Date of Patent: Sep. 15, 1987

[54] WINDING MANDREL ESPECIALLY FOR A SAFETY STRAP

[75] Inventor: Alain P. Tourret, Audincourt, France

[73] Assignee: Aciers et Outillage Peugeot, Audincourt, France

[21] Appl. No.: 878,764

[22] Filed: Jun. 26, 1986

[30] Foreign Application Priority Data

Jun. 26, 1985 [FR] France ................. 85 09741

[51] Int. Cl.[4] ............................... F16B 21/00
[52] U.S. Cl. ........................................ 242/74
[58] Field of Search ............... 242/61, 67, 68, 68.5, 242/68.6, 71.8, 71.9, 72 R, 74, 77, 77.3, 110, 110.1, 115–116, 118.2, 118.7, 130, 130.4, 107.4 R; 411/511, 516, 517, 521, 349, 337

[56] References Cited

U.S. PATENT DOCUMENTS

| 1,762,516 | 6/1930 | Hlavac | 242/46.6 |
| 2,964,174 | 12/1960 | Litchfield et al. | 242/68.5 |
| 3,285,528 | 10/1966 | Beindorf | 242/68 |
| 3,756,523 | 9/1973 | De Young | 242/46.6 |
| 4,378,913 | 4/1983 | Fohl | 242/74 |
| 4,384,687 | 5/1983 | Lamoureux | 242/74 X |
| 4,413,793 | 11/1983 | Komatsubara et al. | 242/68 |
| 4,506,843 | 3/1985 | Luhrig | 242/74 |

FOREIGN PATENT DOCUMENTS 2704084 8/1977 Fed. Rep. of Germany.

Primary Examiner—Donald Watkins
Attorney, Agent, or Firm—Sughrue, Mion, Zinn, Macpeak & Seas

[57] ABSTRACT

This winding mandrel, especially for a safety strap, comprises a plastic winding body moulded on a metal insert (1) which has a slot (2) for the passage of one end of the strap. The insert (1) consists of a piece which has a cross-section with multiple branches (3b, 3c) arranged symmetrically in relation to the axis of the said mandrel. This piece is composed of two elements (3,4), each comprising a core (3a) and flared wings (3b, 3c), these elements being fastened to one another by means of their cores.

3 Claims, 12 Drawing Figures

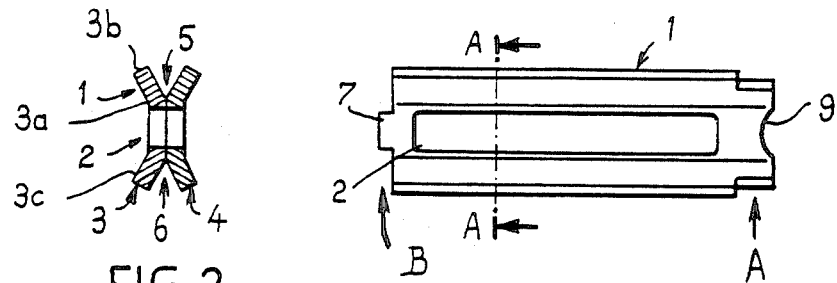
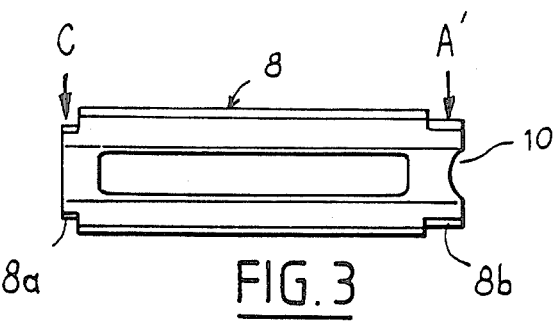
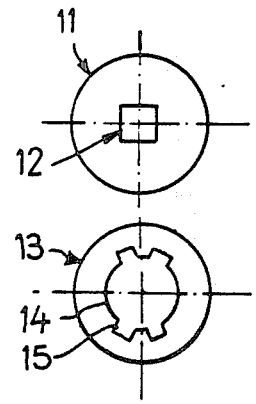

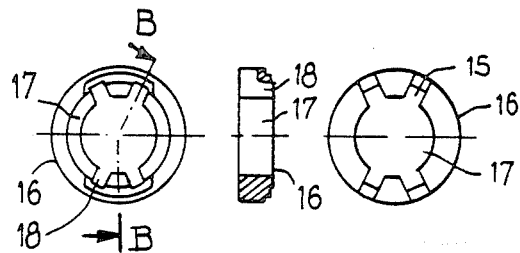
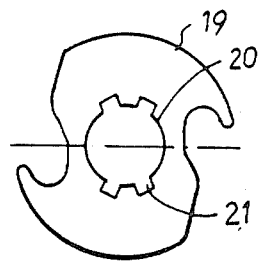
FIG. 6   FIG. 7   FIG. 8         FIG. 9
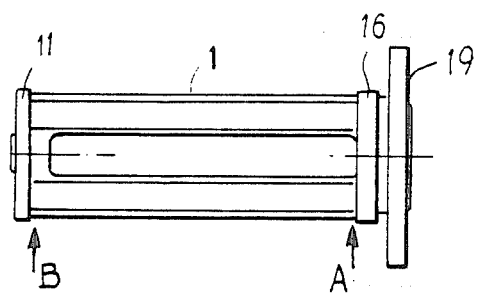
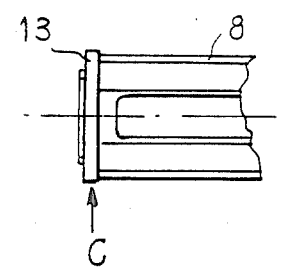
FIG. 10                    FIG. 11
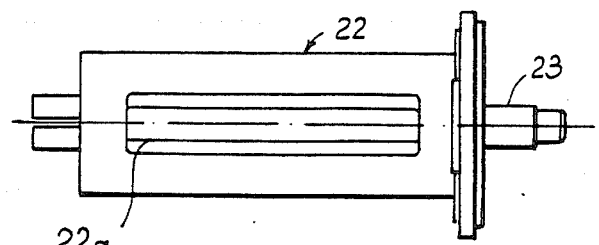
FIG. 12

WINDING MANDREL ESPECIALLY FOR A SAFETY STRAP

The present invention relates to retractors for safety straps. More particularly, the invention relates to a winding mandrel for a safety strap, which is mounted rotatably in a support of a retractor and around which the strap is intended to be wound under the action of an elastic restoring force.

French Specification No. 2,525,479 makes known an assembly which has, as a central core, a metal strip which is coated in moulded plastic and in which the strap is anchored, and which defines two axial bearing surfaces, by means of which the assembly is mounted rotatably in the support. The said rigid central assembly has, at each of its ends, a circular reinforcing plate fitted perpendicularly on the corresponding end of the metal strip in the bearing zone of this assembly.

Furthermore, the periphery of each plate is only covered with a thin plastic coating layer.

French Pat. No. 2,476,491 also makes known a retractor for a safety strap, of the type comprising a support and a rigid central assembly which is integral with one end of the strap and is mounted rotatably in the support and around which the strap is intended to be wound under the action of an elastic restoring force, this assembly also being associated with a locking mechanism which is capable of preventing the assembly from rotating in the unwinding direction of the strap, when a critical amount of acceleration or deceleration exerted on the strap and/or on the support is exceeded, the said assembly having a central metal core which is coated in moulded plastic, forming round this core two coaxial bearing surfaces, by means of which the assembly is suspended rotatably in the support, the said metal core having the form of a mandrel of circular cross-section provided with a longitudinal slot extending over its entire length.

Furthermore, German Specification No. 2,704,084 makes known a rigid central assembly, also called a mandrel, for a retractor of this type. A metal strip gives this assembly the mechanical rigidity required to transmit the forces exerted on the strap to the locking mechanism, to which it is coupled by means of a rigid connection. As regards the coating, this is intended to anchor the assembly. Finally, this coating has to provide the bearing surfaces fitted into bearing holes made in the support.

The assemblies described in these documents have a certain number of disadvantages, particularly as regards the transmission of the stresses exerted by the strap on the plastic coating and the means of locking this strap, because of the configuration of this metal strip.

In fact, this metal strip contributes little to supporting the stresses exerted on the mandrel, for example during the locking of the latter, and the plastic coating has to be sufficiently resistant not to be damaged, especially in the region of the surfaces ensuring contact and transmission of these stresses between the coating and the metal strip.

Moreover, when relatively high stresses are exerted on the mandrel and the metal strip of the latter is located in certain positions, the mandrel tends to bend.

Finally, the assemblies according to the state of the art are difficult to construct automatically, thus entailing a relatively high cost price.

The object of the invention is, therefore, to solve the problems mentioned above and to provide a winding mandrel for a safety strap which is of simple design and which can be produced at a relatively low cost price, whilst at the same time having great strength.

To achieve this, the subject of the invention is a winding mandrel, especially for a safety strap, comprising a plastic winding body moulded on a metal insert, the body and the insert having a slot for the passage of one end of the said strap, characterized in that the metal insert consists of a piece having a cross-section with multiple branches arranged symmetrically in relation to the axis of the said mandrel.

The invention will be understood better by means of the following description given purely as an example and made with reference to the accompanying drawings in which:

FIG. 1 shows a first embodiment of an insert forming part of a winding mandrel according to the invention;

FIG. 2 shows a sectional view along the line A—A of FIG. 1;

FIG. 3 shows a second embodiment of an insert forming part of a winding mandrel according to the invention;

FIG. 4 shows a front view of a washer which can be fitted onto a first end of the insert illustrated in FIG. 1;

FIG. 5 shows a front view of a washer which can be fitted onto a first end of the insert illustrated in FIG. 3;

FIG. 6 shows a front view of a piece which can be fitted onto the second end of the inserts illustrated in FIGS. 1 and 3;

FIG. 7 shows a sectional view along the line B—B of FIG. 6;

FIG. 8 shows a rear view of the piece illustrated in FIG. 6;

FIG. 9 shows a cam which can be fitted onto the second end of the metal inserts and which makes it possible to connect this metal insert to a device blocking the rotation of the latter, this device forming part of a winding assembly of a safety belt;

FIGS. 10 and 11 show an assembled winding mandrel before a winding body is moulded on; and FIG. 12 Shows a winding mandrel after the plastic winding body has been moulded on, an axle having been arranged in the winding mandrel.

As can be seen in FIGS. 1 and 2, an insert forming part of a mandrel according to the invention consists, for example, of a piece 1 having a cross-section with four branches and possessing, in its central part, a slot 2 which, as is known, is intended to allow one end of a safety-belt strap to pass through and be retained. As can be seen more particularly in FIG. 2, the insert 1 consists of two identical elements 3 and 4 having a cross-section in the general form of a V with a flattened tip, and consequently possessing a core, (centeral portion) for example 3a, from which two flared wings 3b and 3c extend. Each of the elements is provided with a slot which, when the insert is assembled, is located opposite the slot in the other element, so as to define the slot 2 mentioned above.

The elements 3 and 4 are fastened to one another for example by welding their cores, and this welding is carried out in the zones 5 and 6 defined by the junctions of the flared wings of the two elements. This welding can be made easier by the presence of bosses or projecting beads obtained by means of cold-forming on one of the elements, so that, when the two elements are presented to one another before welding, a projection on one of the elements is arranged opposite a plane part of the other element, thus providing two welding projections on either side of the insert when the latter is formed.

Since this insert is to be used in a retractor for a safety strap, such as, for example, that described in French Pat. No. 2,476,491 granted in the Applicant's name, one end A of this insert has a shape which, in practice, is governed by the structure of this retractor and which will be described later. However, one end B of this insert can have different forms.

Thus, for example, as shown in FIG. 1, this end B has a centering stud 7 extending from the core of each element forming the insert. On the other hand, and as shown in FIG. 3, an insert 8 of a general structure similar to the insert 1 illustrated in FIG. 1 has one end C, corresponding to the end B of the insert 1, formed by an extension 8a, the cross-section of which is similar to that of the insert, but the branches of which are shorter than those of the cross-section of the insert.

An end A' of this insert 8 of a shape similar to the end A of the insert 1 likewise takes the form of an extension 8b, the cross-section of which is similar to that of the insert, but the branches of which are shorter than those of the cross-section of the insert. It should be noted that this extension 8b has a length greater than the extension 8a of the end C of the insert.

The inserts 1,8 have a recess 9, 10 of rounded shape at their ends A and A' respectively.

When the mandrel is assembled, a washer 11, such as that shown in FIG. 4, having a substantially square central cut-out 12 is placed on the end B of the insert 1 and engages on the centering stud 7 of this insert, so as to make it easier to orientate the various members of the mandrel during automatic assembly and reinforce this mandrel.

In a similar way, if an insert 8, such as that shown in FIG. 3, is used, a washer 13 shown in FIG. 5 is attached on the end C of this insert and has a central cut-out 14 with four recesses 15 arranged symmetrically in the relation to the centre of this washer, so as to correspond to the branches of the extension 8a of the insert 8. When the mandrel is assembled, this washer 13 is arranged on the end C of the insert 8, and the cut-out 14 and the recesses 15 of this washer, interacting with the extension 8a of this end C, ensure that the said insert has very great strength.

A washer 16 illustrated in FIGS. 6, 7 and 8 is subsequently fitted onto the ends A and A' of the inserts 1 and 8 respectively, and this washer 16 has a central cutout 17, in which four recesses 18 are made in a similar way to those of the washer 13 shown in FIG. 5. This washer 16 can advantageously consist of a cast metal, such as ZAMAK, or of a plastic which is identical to a material to be moulded onto the mandrel as a whole and which is compatible with this material.

Once this washer has been put in place, a cam 19 is fitted onto the end A or A' of the inserts 1 or 8, this cam 19 forming a blocking plate, such as that defined in French Pat. No. 2,476,491 mentioned above, and having a cut-out 20 with four recesses 21, similar to the cut-outs 17 and 14 described above, so as to interact with the extension of the end A or A' of the insert 1 or 8 respectively.

As can be seen in FIG. 10 showing a mandrel before the moulding-on operation, the latter has, for example, an insert 1 on the end B of which the washer 11 is arranged and on the end A of which the washer 16 and the cam 19 are placed.

On the other hand, as shown in FIG. 11, if the insert 8 is used, the washer 13 is located on the end C of the latter.

These pieces are subsequently assembled, for example using knives in the general form of a V to flatten the projecting parts of the ends of the inserts extending beyond the end washer 11 or 13 and beyond the cam 19. These projecting parts can be flattened simultaneously, since they are located opposite one another, in order to form a metallic or semi-metallic assembly which has sufficient mechanical resistance to withstand the stresses liable to be exerted on the finished component.

After this assembly operation, a mandrel 22 (FIG. 12) having a slot 22a for the passage of the strap and possessing the various members described with reference to FIGS. 10 or 11 is formed by moulding-on means known per se, and this mandrel 22 receives an axle 23 intended for supporting this mandrel rotatably in a retractor of a safety strap. This axle is centered by the moulding tool relative to the various elements forming the insert, so that the branches of the insert are arranged symmetrically in relation to the axis of the mandrel and so as to allow an injection of plastic, in order to coat the assembly as a whole and thus form a winding mandrel for a safety strap.

It should be noted that, in this structure, the plastic coating serves primarily as a winding body for the strap and contributes little to the mechanical the strength of the assembly. In fact, the stresses between axle 23 and the plastic forming the winding body are distributed over a large surface, thus making it possible to reduce the risks of damage to such bodies.

Although, in the exemplary embodiments described, the metal insert has a cross-section with four branches arranged symmetrically in relation to the axis of the mandrel, this insert can have a cross-section with multiple branches of a different number, but greater than two.

I claim:

1. A winding mandrel for a safety strap and having an axis, comprising: a plastic winding body molded on a metal insert (1; 8), the body and the insert having slot means (2; 22a) for receiving one end of the strap, wherein the insert is composed of two elements (3, 4) each comprising a central portion (3a) and flared wings (3b, 3c), said elements being fastened to one another at their central portions, so that the wings are arranged symmetrically in relation to the axis of the mandrel.

2. The winding mandrel as claimed in claim 1, wherein the said elements (3,4) are welded to one another.

3. The winding mandrel as claimed in claim 1 or 2 further comprising reinforcing washers (11; 13; 16) attached at the opposite ends of the insert, at least one of said washers having recesses shaped to receive four of said flared wings.

* * * * *